United States Patent
Walley et al.

(10) Patent No.: US 9,232,042 B2
(45) Date of Patent: Jan. 5, 2016

(54) METHOD AND SYSTEM FOR UTILIZING AND MODIFYING USER PREFERENCE INFORMATION TO CREATE CONTEXT DATA TAGS IN A WIRELESS SYSTEM

(75) Inventors: John Walley, Ladera Ranch, CA (US); Thomas Quigley, Franklin, NC (US); Alexander G. MacInnis, Ann Arbor, MI (US); Arya Behzad, Poway, CA (US); Jeyhan Karaoguz, Irvine, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1556 days.

(21) Appl. No.: 11/864,255

(22) Filed: Sep. 28, 2007

(65) Prior Publication Data

US 2009/0023433 A1 Jan. 22, 2009

Related U.S. Application Data

(60) Provisional application No. 60/950,971, filed on Jul. 20, 2007.

(51) Int. Cl.
*H04M 3/00* (2006.01)
*H04M 1/725* (2006.01)
*H04L 29/08* (2006.01)

(52) U.S. Cl.
CPC ......... *H04M 1/72569* (2013.01); *H04L 67/327* (2013.01); *H04M 2250/74* (2013.01)

(58) Field of Classification Search
CPC ............................... H04M 1/021; G06F 17/00
USPC .................. 455/418, 456.1, 414.3, 412.1, 39, 455/414.1, 435.1, 456, 456.3, 41.1; 370/254, 328, 338; 348/231.2, 36, 181; 607/3, 7; 715/835, 745, 513, 215; 600/300, 301; 235/435; 707/3; 340/5.2, 340/423, 10.33, 572.1, 572.4, 10.51; 709/217

See application file for complete search history.

(56) References Cited

U.S. PATENT DOCUMENTS 5,552,806 A 9/1996 Lenchik
5,646,608 A 7/1997 Shintani
(Continued)

FOREIGN PATENT DOCUMENTS

CN 1846209 10/2006
EP 1045355 10/2000
(Continued)

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.
(Continued)

*Primary Examiner* — Kiet Doan
(74) *Attorney, Agent, or Firm* — Oblon, McClelland, Maier & Neustadt, L.L.P.

(57) ABSTRACT

A Wireless mobile communication (WMC) device may be utilized to generate and/or maintain multimedia data files. Context data tags may be utilized to tag the generated multimedia data files to enable convenient identification of multimedia data files. Context data tags may comprise time/date stamps, subject, and/or location attribute. User preference information that is unique to the WMC device and/or a specific device user may be utilized to create context data tags for multimedia data files. The user preference information may be modified and/or updated. Modifications and/or updates of user preference information may be based on post-processing operations, biometric information, and/or self-learning techniques that may comprise operations performed on the multimedia data files. Post-processing operations may be performed on multimedia data files in the WMC device and/or a remote device. Tagged multimedia data files may be re-tagged based on modification to user preference information and/or post-processing operations.

27 Claims, 7 Drawing Sheets

(56) References Cited

U.S. PATENT DOCUMENTS

| | | | |
|---|---|---|---|
| 6,104,922 | A | 8/2000 | Baumann |
| 6,314,297 | B1 | 11/2001 | Karl |
| 7,034,678 | B2 | 4/2006 | Burkley et al. |
| 7,149,503 | B2 | 12/2006 | Aarnio et al. |
| 7,203,486 | B2 | 4/2007 | Patel |
| 7,231,439 | B1 | 6/2007 | Abbott et al. |
| 7,764,812 | B2 | 7/2010 | McQuaide, Jr. |
| 7,779,015 | B2 | 8/2010 | Abbott et al. |
| 8,150,416 | B2 * | 4/2012 | Ribaudo et al. ............ 455/456.1 |
| 2001/0024951 | A1 | 9/2001 | Rignell et al. |
| 2002/0052207 | A1 | 5/2002 | Hunzinger |
| 2002/0069218 | A1 | 6/2002 | Sull et al. |
| 2003/0100315 | A1 * | 5/2003 | Rankin ......................... 455/456 |
| 2003/0154293 | A1 | 8/2003 | Zmolek |
| 2003/0181196 | A1 | 9/2003 | Davidov et al. |
| 2004/0077359 | A1 | 4/2004 | Bernas et al. |
| 2004/0123242 | A1 * | 6/2004 | McKibben et al. ........... 715/513 |
| 2004/0133524 | A1 | 7/2004 | Chamberlain |
| 2005/0187437 | A1 | 8/2005 | Matsugu et al. |
| 2005/0198208 | A1 | 9/2005 | Nystrom |
| 2005/0231611 | A1 * | 10/2005 | Anderson et al. .......... 348/231.2 |
| 2005/0242921 | A1 * | 11/2005 | Zimmerman et al. ........ 340/5.2 |
| 2005/0289469 | A1 * | 12/2005 | Chandler et al. ............. 715/745 |
| 2006/0007315 | A1 | 1/2006 | Singh |
| 2006/0095540 | A1 * | 5/2006 | Anderson et al. ............. 709/217 |
| 2006/0202032 | A1 * | 9/2006 | Kricorissian ................. 235/435 |
| 2007/0016575 | A1 | 1/2007 | Hurst-Hiller et al. |
| 2007/0027911 | A1 | 2/2007 | Hakala et al. |
| 2007/0043583 | A1 * | 2/2007 | Davulcu et al. .................... 705/1 |
| 2007/0239991 | A1 | 10/2007 | Cheng |
| 2008/0021876 | A1 * | 1/2008 | Ahern et al. ...................... 707/3 |
| 2008/0126990 | A1 * | 5/2008 | Kumar et al. .................. 715/835 |
| 2008/0194270 | A1 * | 8/2008 | Greenberg ................. 455/456.1 |
| 2009/0207252 | A1 | 8/2009 | Raghunath |
| 2012/0191147 | A1 * | 7/2012 | Rao et al. ........................... 607/3 |

FOREIGN PATENT DOCUMENTS

| | | |
|---|---|---|
| KR | 2005-0070152 | 7/2005 |
| WO | 2005078676 | 8/2005 |

OTHER PUBLICATIONS

Seagate Technology LLC, Seagate D.A.V.E. (Digital Audio Video Experience) the portable storage platform that collects, plays and manages digital content, Product Overview, 2007.

European Search Report corresponding to European Application Serial No. 08010380.7-2413, mailed Nov. 28, 2008.

International Search Report, PCT/IL 2005/000191, mailed Sep. 9, 2005, 5 pages.

* cited by examiner

METHOD AND SYSTEM FOR UTILIZING AND MODIFYING USER PREFERENCE INFORMATION TO CREATE CONTEXT DATA TAGS IN A WIRELESS SYSTEM

CROSS-REFERENCE TO RELATED APPLICATIONS/INCORPORATION BY REFERENCE

This patent application makes reference to, claims priority to and claims benefit from U.S. Provisional Application Ser. No. 60/950,971 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for utilizing and modifying user preference information to create context data tags to index data in a wireless system.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services comprise such features as text messaging, audio/video streaming, and web browsing.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, cellular technology may allow use of the mobile phone as a form of wireless modem that allows connecting a laptop, for example, to the internet via a cellular network.

Devices aimed at taking advantage of the capabilities of wireless networks may be described as wireless mobile communication (WMC) devices. Today's WMC devices may comprise such devices as cellular phones, PDA's, laptops, and/or other devices.

Most WMC devices nowadays offer more than simple communicative operations. These WMC devices, in addition to providing peer-to-peer communication functions, may allow their users expansive list of personal services and utilities. Some WMC devices may enable a broad scope of gaming, scheduling, task-organizational and/or other services. Additionally, more applications that traditionally were limited to non-wireless and/or non-mobile devices may be used in conjunction with WMC devices. For example, email applications such as Microsoft Outlook® are finding their way to more WMC devices. Other applications that have gained popularity in recent years comprise audio/video applications such as still and moving picture recording application and voice recording applications. These added capabilities and/or applications are slowly turning WMC devices into indispensable on-the-move personal assistants.

However, the promising potential of WMC devices' uses beyond simple communicative operations remains stagnant because of some limitations in the devices themselves, which may include such limitations as power, storage, and/or processing. Also, while a lot of work has been put into expanding WMC devices' potential utility, not a lot of work has been put into convening these new utilities for their users. For example, while the WMC devices offer impressive array of recording, organizing, and tracking services, very little effort has been made to facilitate convenient use of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for creating context data tags to index data in a wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing and modifying user preference information to create context data tags to index data in a wireless system. Wireless devices may be utilized to perform a plurality of jobs and in doing so; the wireless devices may generate data. For example, a wireless device may be utilized to record a conversion, take a picture and/or capture video clip. Subsequently, an audio, video, and/or other type of multimedia data file and/or content may be generated. Various embodiments of the invention provide a mechanism, which may, for example, be utilized to automatically capture and tag multimedia events with context based information. User preference information may be utilized in creating context data tags. This user preference information may specify the type of information that may be utilized in creating the context data tags. The user preference information may be updated and/or modified based self-learning techniques. For example, activities performed by a device user in the devices, especially activities pertaining to generated and/or tagged data, may be utilized to modify user preference information. Tagged data may be re-tagged when user preference are modified and/or updated.

Figure 1:
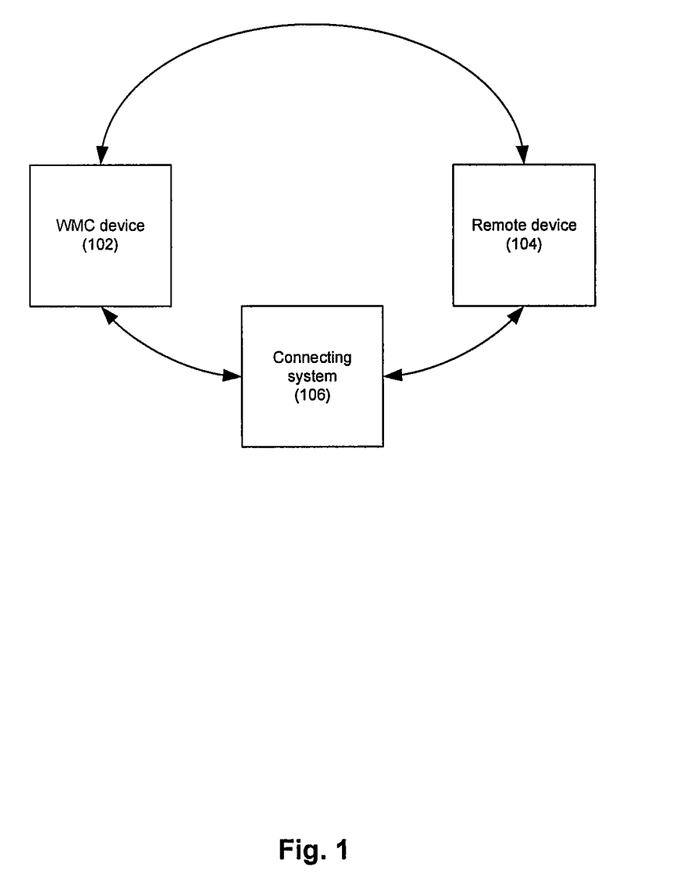
FIG. 1 is a block diagram that illustrates an exemplary communication setup between a wireless mobile communication (WMC) device and a remote device, which may utilize context data tags, in accordance with an embodiment of the invention.

FIG. 1 is a block diagram that illustrates an exemplary communication setup between a wireless mobile communication (WMC) device and a remote device, which may utilize context data tags, in accordance with an embodiment of the invention. Referring to FIG. 1, there is shown a Wireless mobile communication (WMC) device 102, a remote device 104, and a connecting system 106.

The WMC device 102 may comprise suitable logic, circuitry and/or code that may enable performing wireless mobile communication. For example, the WMC device 102 may be utilized to perform voice, video and/or text message peer-to-peer communication. The WMC device 102 may also comprise suitable logic, circuitry and/or code that may enable performing additional functionality comprising Internet browsing, video streaming, and/or audio recording. For example, the WMC device 102 may comprise a digital camera that may enable generating sill pictures and/or video streams. Also, the WMC device 102 may comprise a microphone that may enable generating audio recordings.

The remote device 104 may comprise suitable logic, circuitry and/or code that may be enabled to communicate to with the WMC device 102. The invention may not be limited to a specific remote device, but may comprise for example, a general purpose processing device, a specialized processing device, and/or a specialized peripheral device which may be enabled to perform various jobs and/or tasks that may be requested by the WMC device 102. For example, the remote device 104 may comprise a home PC that may be more capable of performing processing and/or storage operations than the WMC device 102 due to more powerful processing subsystems and/or increased memory space compared to the WMC device 102. Such home PC may be better suited to perform processing and/or storage intensive tasks that otherwise would have to be performed in the WMC device 102. For example, the WMC device 102 may utilize the remote device 104 to perform processing operations on data that may have been created and/or maintained in the WMC device 102.

The connecting system 106 may comprise a plurality of interconnecting networks and suitable logic, circuitry and/or code that may be enabled to facilitate end-to-end communication between the WMC device 102 and the remote device 104. The connecting system 106 may comprise wireless and/or wired networks that may be enabled to communicate and forward messaging and/or data between the WMC device 102 and the remote device 104. The connecting system 106 may be utilized to provide a transport and/or switching fabric that may facilitate communication between the WMC device 102 and the remote device 104.

In operation, the WMC device 102 may communicate with the remote device 104 through the connecting system 106, or alternatively, where possible, the WMC device 102 may communicate directly with the remote device 104.

The WMC device 102 may be utilized for non-communicative tasks. For example, the WMC device 102 may be utilized to create video, audio, and/or other types of multimedia data files. In order to provide convenient usability of generated and/or maintained multimedia data files, the WMC device 102 may create context data tags, which may be utilized to tag the multimedia data files based on their contents. Context data tags may enable identifying multimedia data files without having to directly access the multimedia data files and/or examine the contents of the multimedia data files. For example, a WMC device 102 may be enabled to tag picture files and/or multimedia content while they are being generated or after the files have been generated. Rather than having to compare picture files based on their content (actually comparing pictures), the WMC device 102 may be utilized to create context data tags that may identify such picture files simply by reading these context data tags. The context data tags may comprise information about the content of the multimedia data file and/or information that may help identify the multimedia data files. For example, a context data tag of a picture file may comprise information such as location, date, name of person(s) in the picture, and/or information pertaining to a subject of the picture file.

When attempting to identify picture files, it may suffice to simply examine the corresponding context data tags. The location attribute may identify a location where a multimedia data file was created and/or accessed. For example, the location attribute in a context data tag of a digital picture may indicate that the picture was taken in New York City, and thus it may suffice to read out that information rather than having to view the content of the digital picture. The subject attribute may identify information pertaining to circumstances when a multimedia data file was created and/or accessed. For example, the subject attribute in a context data tag of a digital picture may indicate that the picture was taken during a business meeting. Such subject attribute may be derived from the contents of the multimedia data file itself, or it may be derived from other applications utilized in the WMC device 102 when the multimedia file was created and/or accessed. For example, calendar applications such as Microsoft Outlook® may be utilized, with other relevant information such as data and/or time information, to create context data tag for a digital picture, which may indicate that the digital picture was taken during a business meeting with persons X and Y in New York City.

In accordance with an embodiment of the invention, creating and/or updating context data tags may utilize user preference information that may be created, maintained, and/or updated within the WMC device 102. The WMC device 102 may be enabled to utilize other applications in the WMC device 102 when creating and/or updating the context tags, and to update any such preference information in the WMC device 102. In an exemplary embodiment of the invention, the WMC device 102 may be enabled to utilize scheduling or calendar applications such as Microsoft Outlook® when creating context data tags to ascertain whether a picture file was created during a business meeting. The WMC device 102 may utilize user preference information in generating the context data tags. The user preference information may comprise information that may be specific to a user of the WMC device 102. Notwithstanding, the invention may not be so limited and other criteria may be utilized. For example, the type of tags generated may be dependent on the time of day, location, an event, biometric information and/or other factors. The user preference information may enable determining specific attributes that the user may prefer to be utilized in creating the context data tags. For example, the user preference information may indicate that a user of the WMC device 102 may only desire utilizing subject attribute in creating context data tags for multimedia data files.

Post-processing operations may be performed on multimedia data files generated and/or maintained in the WMC device 102. Post-processing operations may comprise processing operations that may be performed on tagged multimedia data files. For example, the WMC device 102 may not be enabled to perform complex analysis and/or editing operations of multimedia data files. Speech recognition applications may entail utilization of processing, storage, and/or power resources that may not be available in the WMC device 102 when the multimedia data files were generated and/or accessed, and tagged. Instead, tagged multimedia data files may be processed subsequently either when such resources may become available in the WMC device 102, or in such scenarios as when these tagged multimedia data files may be transferred to the remote device 104. Also, post-processing may entail utilizing applications that may not be available in the WMC device 102. For example photo editing of digital pictures may necessitate utilizing specific software, and the device user may desire keeping such software, for licensing reasons, in a single remote device wherein multimedia data files from multiple sources may be transferred there for editing. Post-processing operations may comprise and/or necessitate re-tagging the multimedia data files utilizing new attributes. For example, a device user may access tagged multimedia data files, and may utilize new attribute to re-tag the accessed tagged multimedia data files. The multimedia data files may initially be tagged with context data tags that comprise only subject attributes that subsequent post-processing may enable, based on analysis of the content of the multimedia data files for instance, utilizing location information in accessing the tagged multimedia data files. New context data tags may then be generated which may comprise both subject and location attributes.

User preference information may be modified and/or updated. WMC device 102 may utilize self-learning and/or adaptive techniques for updating and/or modifying user preference information. For example, utilization of attributes different from ones originally utilized with the multimedia data files may enable the WMC device 102 to modify user preference information to use the newly utilized attributes. The WMC device 102 may modify user preference information to use location and subject attribute in tagging multimedia data files of some time, for example digital pictures. Tagged multimedia data files may be re-tagged when user preference information is modified and/or updated. For example, user preference information may be modified to utilize location attribute in addition to subject attribute where subject attributes indicated the multimedia data files were generated and/or accessed during business-related activities. Tagged multimedia data files with subject attribute indicating business-related data may be re-tagged with new context data tags that may utilize location attribute in addition to subject attributes.

The WMC device 102 may utilize the remote device 104 to perform operations related to tagging multimedia data files and/or creation, maintenance, and/or modification of user preference information. The remote device 104 may be enabled to perform tagging of multimedia data files substantially similar to the WMC device 102 as describe hereinbefore. In such scenarios, the WMC device 102 may transfer untagged multimedia data files generated and/or accessed in the WMC device 102 to the remote device 104. The remote device 104 may generate context data tags corresponding to the received multimedia data files, and utilize the generated context data tags to tag the received multimedia data files. Other operations may also be performed in the remote device 104, especially operations that may be processing and/or storage intensive, which the remote device 104 may be better suited to perform. For example, performing post-processing operations on a large set of tagged multimedia data files utilizing new search and/or identification attribute may require substantial processing and/or storage resources. Also, performing post-processing operations in the WMC device 102 may require considerable use of power supply, which may be limited in the WMC device 102 because of battery limitations. Instead, the WMC device 102 may distribute and/or delegate performing any such post-processing operations to the remote device 104. Additionally, performing such operations in the remote device may be more logical where multimedia data files may be stored in the remote device 104. User preference information may be retained in the remote device 104. This may enable concurrent utilization of the same user preference information in different devices, including the WMC device 102.

Figure 2A:
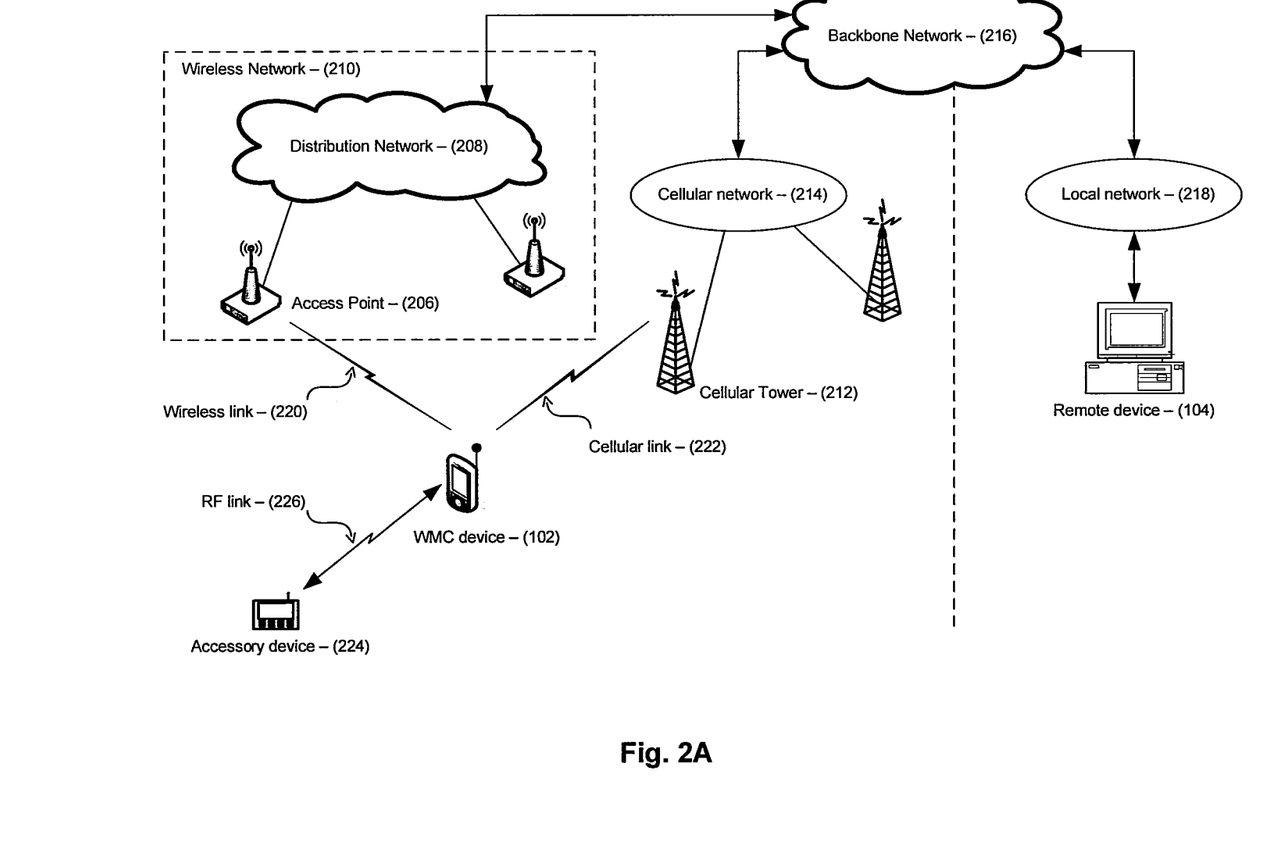
FIG. 2A is a block diagram that illustrates an exemplary model for setup that includes a wireless mobile communication (WMC) device and a remote device, which may utilize context data tags, in accordance with an embodiment of the invention.

FIG. 2A is a block diagram that illustrates an exemplary model for setup that includes a wireless mobile communication (WMC) device and a remote device, which may utilize context data tags, in accordance with an embodiment of the invention. Referring to FIG. 2A, there is shown a WMC device 102, a remote device 104, an access point 206, a distribution network 208, a wireless network 210, a cellular tower 212, a cellular network 214, a backbone network 216, a local network 218, a wireless link 120, a cellular link 222, an accessory device 224, and a RF link 226.

The wireless network 210 may comprise a plurality of the access point 206, the distribution network 208 and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 206 may comprise suitable logic, circuitry, and/or code that may be utilized to provide the necessary access infrastructure for the WMC device 102 to access the wireless network 210. The distribution network 108 may comprise suitable logic, circuitry, and/or code that may be adapted to operate as a backbone network that may be responsible for transport and link functionality for a plurality of access points in the wireless network 210.

The cellular network 214 may comprise plurality of the cellular tower 212 or base stations, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 224 may comprise suitable logic, circuitry and/or code that may enable performing some accessory functionality in conjunction with the use of the WMC device 102. For example, the accessory device may comprise a hands-free headset. The WMC device 102 may interact with the accessory device 224 over a short-range RF link 226, for example. The RF link 226 may utilize, for example, a standardized technology for inter-device short range communication. For example, the RF link 226 may correspond to a Bluetooth® connection or ZigBee connection between the accessory device 224 and the WMC device 102.

The local network 218 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 216 may comprise suitable logic, circuitry, and/or code that may be adapted to provide overall system connectivity between sub-networks. The backbone network 216 may be enabled to interact with, and connect different wired and/or wireless technologies. For example, the backbone network 216 may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 220 to access the wireless network 210 via the access point 206. The WMC device 102 may also utilize the cellular link 222 to access the cellular network 214 via the cellular tower 212. The WMC device 102 may attempt to communicate with the remote device 104 via the wireless network 210 through the access point 206 and the distribution network 208. The distribution network 208 may enable forwarding messages and/or data sent from, and to the WMC device 102. The backbone network 216 may enable connectivity between local networks, for example wireless network 210, and cellular network 214. The remote device 104 may receive communication from the WMC device 102 by interacting with the backbone network 216. Necessary protocol-based operations may be performed to facilitate the transmission of information through all the different components. This may comprise use of exemplary protocols such as IP, and SS7.

Once the WMC device 102 establishes connection with the remote device 104, the WMC device 102 may utilize the remote device 104 in operations pertaining to multimedia data files substantially as described in FIG. 1. The WMC device 102 may utilize context data tags corresponding to multimedia data files created and/or maintained in the WMC device 102. Alternatively, tagging operations may be performed in the remote device 104 after the multimedia data files are transferred from the WMC device 102 to the remote device 104. Post-processing operations may be performed in the WMC device 102 and/or in the remote device 104. Post-processing operations may comprise re-tagging the multimedia data files utilizing new attribute and/or such operations as editing the multimedia data files, for example photo editing of digital pictures. While user preference information may be stored directly in the WMC device 102, the user preference information may also be stored external to the WMC device 102, for example in the remote device 104.

User preference information may be utilized in tagging multimedia data files. User preference information may comprise attributes that are preferred for tagging multimedia data files. The user preference information may be updated and/or modified, and such updates and/or modification may be performed in the WMC device 102 and/or the remote device 104. Self-learning and/or adaptive techniques may be utilized for performing modifications and/or updates of user preference information. Self-learning techniques may utilize subsequent operations that may be performed on existing and/or new multimedia data files. For example, post-processing operations may enable updating user preference information with new attributes utilizing in such post-processing operations.

Figure 2B:
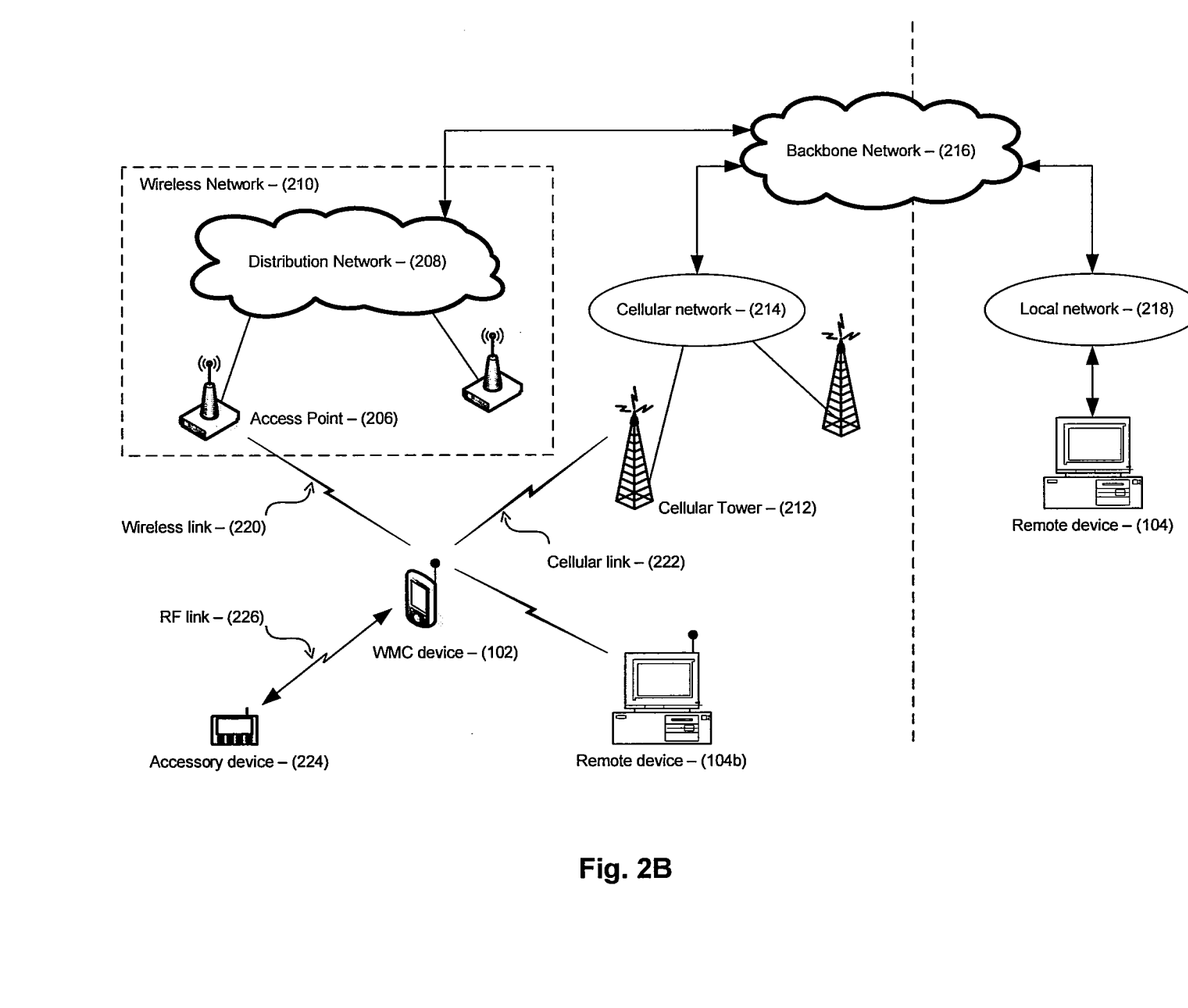
FIG. 2B is a block diagram that illustrates an exemplary model for setup that includes a wireless mobile communication (WMC) device communicating directly with a remote device, which may utilize context data tags, in accordance with an embodiment of the invention.

FIG. 2B is a block diagram that illustrates an exemplary model for setup that includes a wireless mobile communication (WMC) device communicating directly with a remote device, which may utilize context data tags, in accordance with an embodiment of the invention. Referring to FIG. 2B, there is shown the WMC device 102, the remote device 104, the access point 206, the distribution network 208, the wireless network 210, the cellular tower 212, the cellular network 214, the backbone network 216, the wireless link 220, the cellular link 222, the accessory device 224, the RF link 226, and a remote device 104b.

The remote device 104b may be similar to the remote device 104. However, the remote device 104b may also comprise suitable logic, circuitry, and/or code that may enable wireless connectivity. The WMC device 102 may communicate directly with the remote device 104b via a wireless connection.

In operation, the WMC device 102, the remote device 104, the access point 206, the distribution network 208, the wireless network 210, the cellular tower 212, the cellular network 214, the backbone network 216, the accessory device 224, and the RF link 226 may operate similar to FIG. 2A. The remote device 104b may operate similar to the remote device 104 as described in FIG. 1 and FIG. 2A. However, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device 102 may have to communicate with the remote device 104 through a plurality of connecting networks and/or entities.

Once the WMC device 102 establishes connection with the remote device 104*b*, the WMC device 102 may utilize the remote device 104*b* in operations pertaining to multimedia data files substantially as described in FIG. 1 and FIG. 2A. The WMC device 102 may utilize context data tags corresponding to multimedia data files created and/or maintained in the WMC device 102. Alternatively, tagging operations may be performed in the remote device 104 after the multimedia data files are transferred from the WMC device 102 to the remote device 104. Post-processing operations may comprise re-tagging the multimedia data files utilizing one or more new attributes and/or such operations as editing the multimedia data files, for example photo editing of digital pictures. Post-processing operations may be performed in the WMC device 102 and/or in the remote device 104.

User preference information may be utilized in tagging multimedia data files. User preference information may comprise attributes that are preferred for tagging multimedia data files. User preference information may be stored directly in the WMC device 102; alternatively, the user preference information may be stored external, for example in the remote device 104. User preference information may be modified and/or updated. Various self-learning and/or adaptive techniques may be utilized in performing modifications and/or updates of user preference information. Self-learning techniques may utilize subsequent operations that may be performed on existing and/or new multimedia data files. For example, post-processing operations may enable updating user preference information with new attributes utilizing in such post-processing operations. Updates and/or modifications of user preference information may be performed in the WMC device 102 and/or the remote device 104

The remote device 104*b* may be utilized to perform tagging of multimedia data files generated and/or accessed in the WMC device 102, and the remote device 104*b* may utilize context data tags to perform such tagging. Post-processing operations may be performed in the remote device 104*b* on tagged multimedia data files. Post-processing operations may comprise re-tagging the multimedia data files utilizing new attribute and/or such operations as editing the multimedia data files, for example photo editing of digital pictures. The remote device 104*b* may be utilized to store and/or maintain user preference information. User preference information may be utilized in tagging multimedia data files, and it may comprise attributes that are preferred for performing any such tagging. The remote device 104*b* may be utilized to perform modifications and/or updates of user preference information. Self-learning techniques may be utilized in performing modifications and/or updates of user preference information. The self-learning techniques may utilize subsequent operations that may be performed on existing and/or new multimedia data files. For example, post-processing operations may enable updating user preference information with new attributes utilizing in such post-processing operations.

Figure 3:
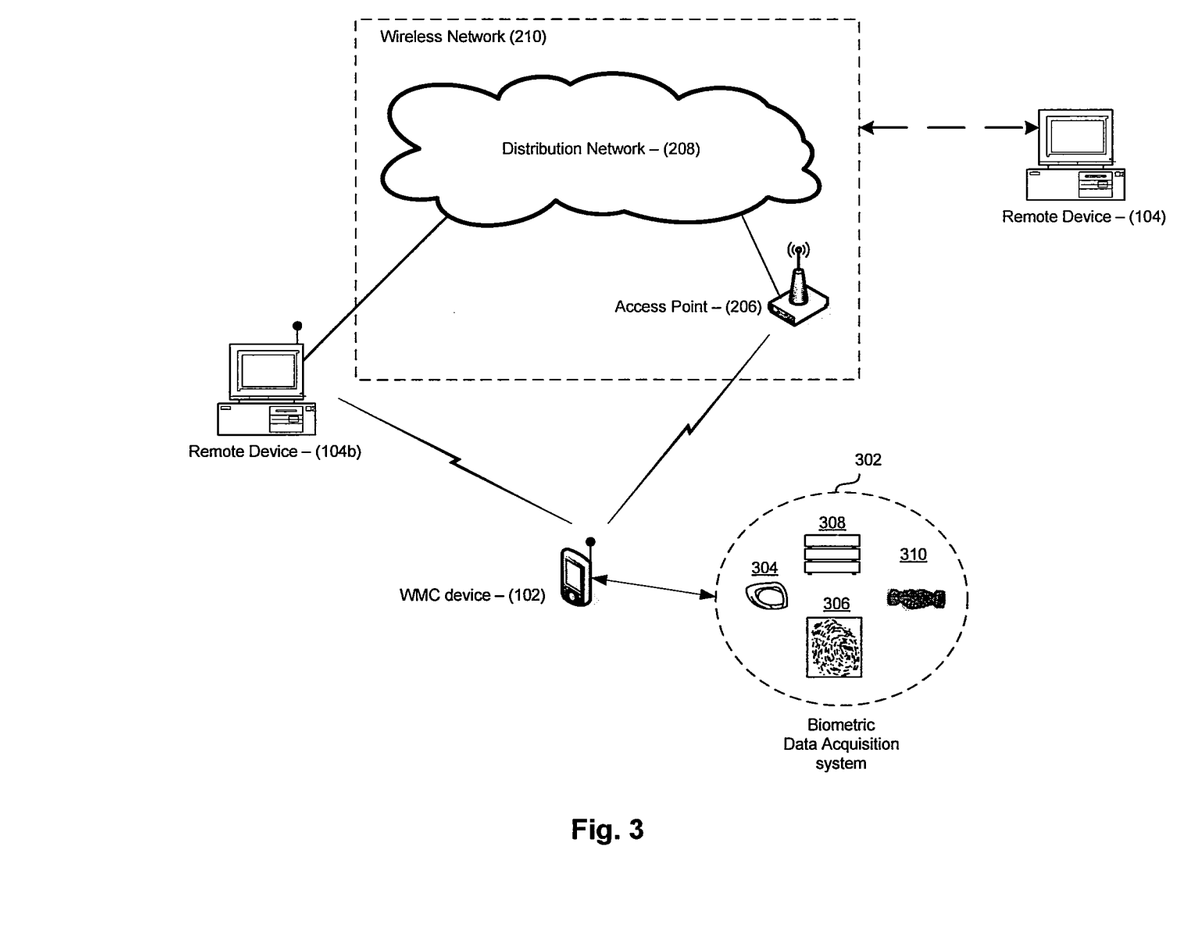
FIG. 3 is a block diagram illustrating a wireless mobile communication (WMC) device utilizing biometric data, in accordance with an embodiment of the invention.

FIG. 3 is a block diagram illustrating a wireless mobile communication (WMC) device utilizing biometric data, in accordance with an embodiment of the invention. Referring to FIG. 3, there is shown the Wireless mobile communication (WMC) device 202, the access point 206, the distribution network 208, the wireless network 210, the remote device 104, the remote device 104*b*, and a biometric data acquisition system 302.

The biometric data acquisition system 302 may comprise a biometric sensor 304, acquired biometric data 306 (from user), a pattern recognition database 308, an authentication and validation procedure 310, and suitable logic, circuitry and/or code that may enable performing biometric validation and modification procedures. Biometric data, which may comprise finger prints, retina data, or behavioral patterns, may be unique to a person. Biometric data may be classified into two main types: physiological and behavioral biometric data. The physiological biometric data may be related to the physical aspect of the body such as facial features, finger prints, hand shape, iris blood vessel pattern (iris scan) and DNA sequences. The behavioral biometric data may be related to the expression of personality such as Electroencephalogram (EEG) that senses and measures brain wave activities, signature, hand writing and voice. Therefore the biometric data may be representative of the actual person or user.

The biometric sensor 304 may comprise suitable logic, circuitry and/or code that may enable acquiring user's biometric data in the curse of his or her use of the WMC device 102. An example of the biometric sensor 304 may be a finger print scanner, an iris scanner, hand scanner, brain wave electrodes or a voice coder. The acquired biometric data 306 may comprise biometric data acquired by the biometric sensor 304 form the user's prior use of the WMC device 102. For example, the acquired biometric data 306 may comprise the user's finger prints, iris scan, voice pattern, and/or behavioral patterns. The pattern recognition database 308 may comprise suitable logic, circuitry and/or code that may enable storing the acquired biometric data 306. The authentication and validation procedure 310 may comprise suitable logic, circuitry and/or code that may enable authenticating biometric data read during the use of the WMC device 102 by comparing the read data against the acquired biometric data 306 stored in, and retrieved from the pattern recognition database 308.

In operation, the WMC device 102 may communicate with the remote device 104*b* via the wireless network 210 by accessing the distribution network 208 through the access point 206. The WMC device 102 may also communicate directly with the remote device 104*b* over a wireless connection. Alternatively, the WMC device 102 may utilize the wireless network 210 to communicate with the wireless device 104 substantially similar to FIG. 1. Once the WMC device 102 establishes communication with remote devices 104 and/or 104*b*, the WMC device 102 may utilize the devices for tagging multimedia data files, performing post-processing operations, and/or updating and modifying user preference information substantially as described in FIG. 1, FIG. 2A, and FIG. 2B. The WMC device 102 and/or the remote devices 104 and/or 104*b* may utilize context data tags for tagging multimedia data files that may be generated and/or maintained in the WMC device 102. User preference information may be utilized to tag multimedia data files wherein the user preference information may comprise preferred attribute that may be utilized in creating the context data tag. The user preference information may be stored and/or maintained in the WMC device 102 and/or the remote devices 104 and/or 104*b*. The user preference information may be updated and/or modified in the WMC device 102 and/or the remote devices 104 and/or 104*b*, and such updates and/or modifications may utilize self-learning techniques. Post-processing operations may be performed, in the WMC device 102 and/or the remote devices 104 and/or 104*b*, on tagged and/or untagged multimedia data files. Post-processing operations may comprise re-tagging the multimedia data files utilizing new attribute and/or such operations as editing the multimedia data files, for example photo editing of digital pictures.

The biometric acquisition system 302 may be utilized in tagging multimedia data files, performing post-processing operations, and/or in updating the user preference information. For example, the WMC device 102 may utilize voice recognition technique to identify an audio file created by the WMC device 102 user by creating a context data tag that may comprise the name of the speaker. Also, the WMC device 102 may utilize behavioral pattern recognition to ascertain and/or predict specific parameters within the user preference information. For example, the WMC device 102 may utilize behavioral pattern recognition techniques to predict that certain actions performed on the WMC device 102 at certain times, dates, and/or locations correlate to some specific activity that may be personal, business, or leisure in nature. Such knowledge may then be utilized in performing post-processing operations and/or updates and modifications of user preference information. For example, data from behavioral pattern recognition techniques may be utilized to determine new attributes that may be utilized in tagging multimedia data files. Also, these new attributes may be utilized to update and/or modify the user preference information.

Figure 4A:
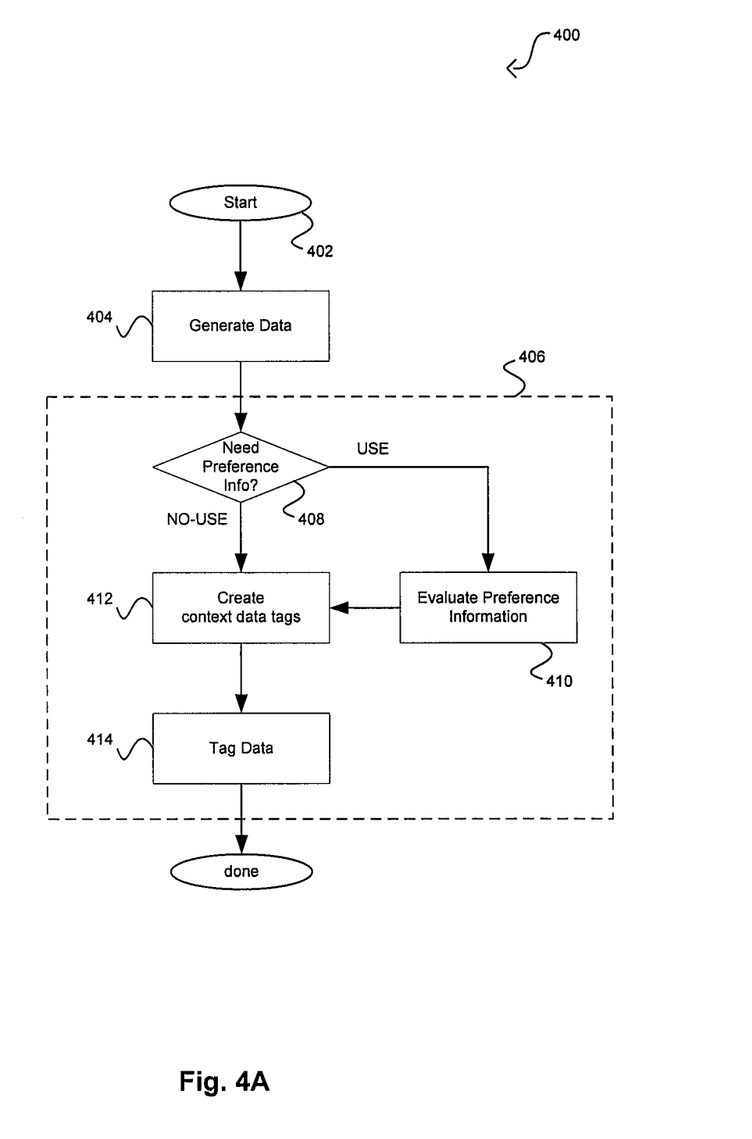
FIG. 4A is a flow diagram that illustrates use of context data tags in data tagging in wireless system, in accordance with an embodiment of the invention.

FIG. 4A is a flow diagram that illustrates use of context data tags in data tagging in wireless system, in accordance with an embodiment of the invention. Referring to FIG. 4A, there is shown a flow chart 400 comprising a plurality of exemplary steps. In step 402, the exemplary steps start. The WMC device 102 may be utilized for performing some task which may be a non-communicative task. For example, the WMC device 102 may be utilized to capture digital moving and/or still pictures. In 404, multimedia data files may be generated and/or modified in the WMC device 102 in the course of performing the task in step 402. This may comprise creating a multimedia data file, such as an audio clip, a video clip, a picture, and/or other possible outcome of performing jobs on the WMC device 102. The exemplary steps may proceed to step 406. In step 406, tagging of multimedia data files generated in step 404 may be performed. Tagging may performed in the WMC device 102 or, alternatively, it may performed in the remote device 104 after the multimedia data files are transferred there from the WMC device 102.

In step 408, a determination whether to utilize user preference information may be performed. In instances where the user preference information may not be utilized, and the exemplary steps may proceed to step 412. In instances were it may be determined that the user preference information may be utilized, the exemplary steps may proceed to step 410. In step 410, the user preference information may be evaluated for tagging multimedia data information and/or files generated and/or modified in step 404. Because user preference information may not be stored within the WMC device 102, the user preference information may have to be transferred into the WMC device 102. User preference information may comprise information that may enable determining any attributes that may be utilized and/or may be preferred in creating context data tags. For example, the user preference information may be based on repetitive operations by the users at certain times and/or locations. The user preference information may also be correlated to specific activities that may be ascertained from some scheduling application running in the WMC device 102, for example Microsoft Outlook®. For example, user preference information may enable determining that only location and time stamps may be utilized in tagging digital pictures generated and/or modified in the WMC device 102 during business-related activities.

In step 412, a context data tag may be created for the generated data. The context data tag may improve usability of the generated data by making identification of data more convenient. The context data tag may comprise such information as time and/or date stamp, location stamp, which may be ascertained using such application as GPS services, and other information that may be derived from the user preference information. User preference information may enable ascertaining the context of the use of the WMC device 102 to generate the data; for example, whether the WMC device 102 use pertains to business or personal purpose. In step 414, the context data tags generated in step 412 may be utilized to tag the generated data.

Figure 4B:
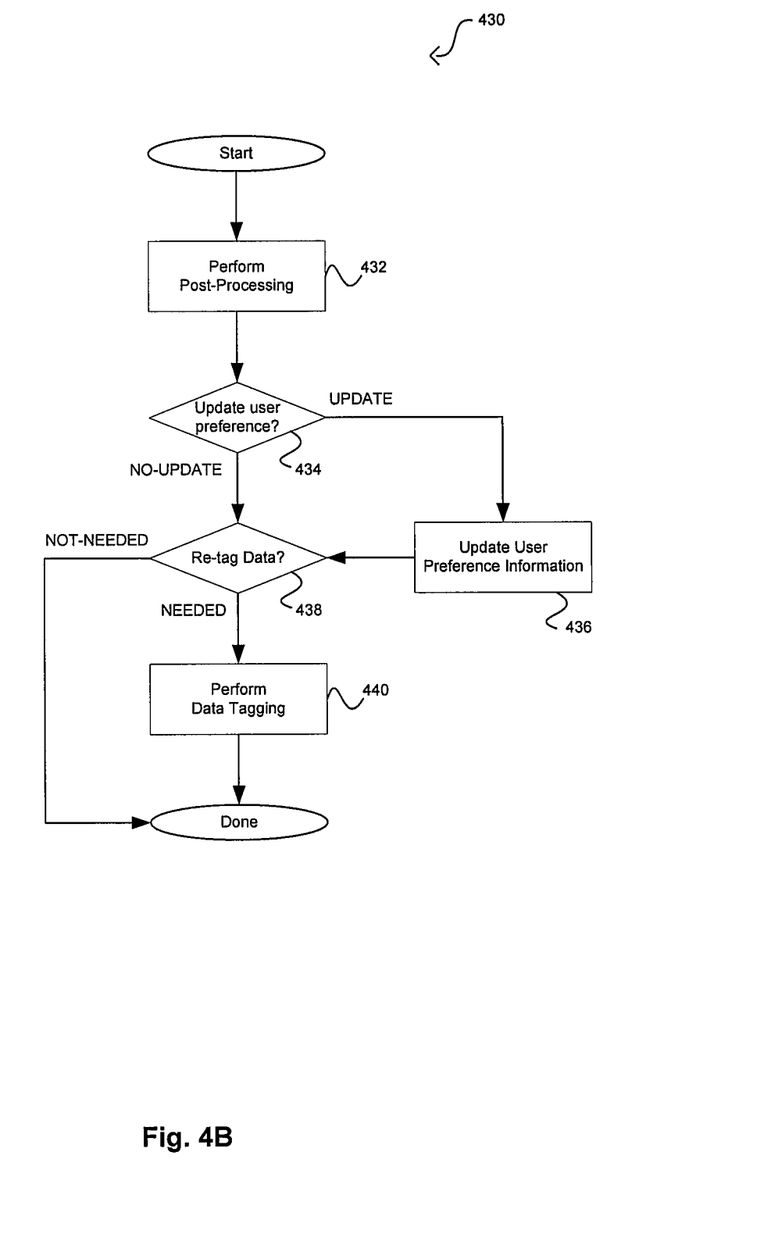
FIG. 4B is a flow diagram that illustrates exemplary steps for performing post-processing operations on tagged data in wireless system, in accordance with an embodiment of the invention.

FIG. 4B is a flow diagram that illustrates exemplary steps for performing post-processing operations on tagged data in wireless system, in accordance with an embodiment of the invention. Referring to FIG. 4B, there is shown a plurality of exemplary steps 430. The exemplary steps may be initiated whenever post-processing operations may be performed on tagged multimedia data files stored in the WMC device 102 and/or the remote device 104. In step 432, a post-processing is performed. Post-processing operations may comprise express re-tagging the multimedia data files utilizing new attribute and/or such operations as editing the multimedia data files, for example photo editing of digital pictures, which may necessitate re-tagging the multimedia data files due to possible change in the files' contents. In step 434, it may be determined whether the user preference information needs to be updated. For example, where a device user may utilize new attribute in accessing and/or cataloging multimedia data files of certain type and/or class, the user preference information may be modified to utilize the new attributes in tagging similar multimedia data files in the future. In instances where the user preference information does not need to be updated, the exemplary steps may proceed to step 438. In instances where the outcome of step 434 may be updated, the exemplary steps may proceed to step 436. In step 436, the user preference information may be updated. For example, where user preference information correlates set of time/location pairs to a specific activity, and new pair, based on new time and/or location, may be added to the list.

In step 438, it may be determined whether re-tagging processed data may be performed. In instances tagged data need not be re-tagged, the exemplary steps may proceed to "DONE," where the exemplary steps terminate. In instances where tagged data needs to be re-tagged, the exemplary steps may proceed to step 440. In step 440, re-tagging of the data may be performed. This may be performed substantially similar to step 406 in FIG. 4A.

Figure 4C:
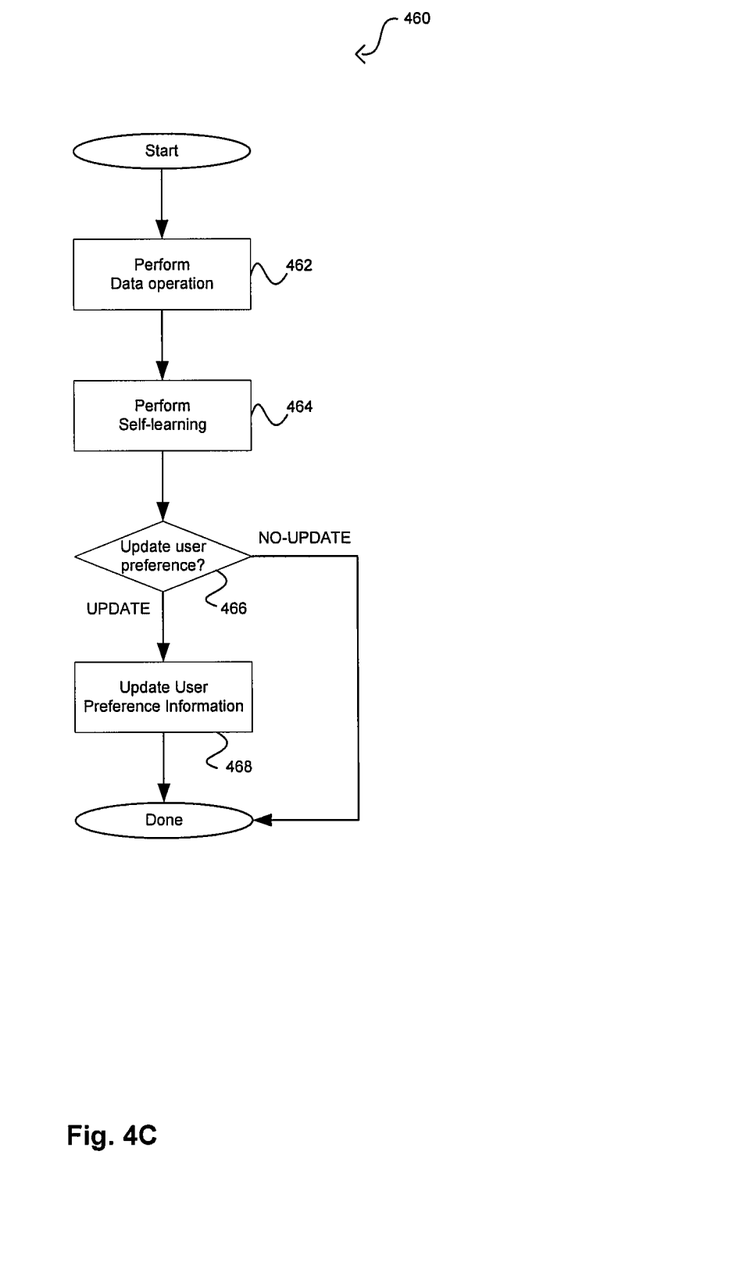
FIG. 4C is a flow diagram that illustrates exemplary steps for performing self-learning operations while updating user preference information, in accordance with an embodiment of the invention.

FIG. 4C is a flow diagram that illustrates exemplary steps for performing self-learning operations while updating user preference information, in accordance with an embodiment of the invention. Referring to FIG. 4C, there is shown a plurality of exemplary steps 460. The exemplary steps may be initiated whenever an operation may be performed that may generate and/or modify multimedia data files stored in the WMC device 102 and/or the remote device 104. In step 462, a data operation may be performed. For example, a specific user of the device may generate a new multimedia data files in the WMC device 102. The WMC device 102 may ascertain specific attribute pertaining to the newly generated multimedia data files. For example, when a new digital picture may be generated in the WMC device 102, the WMC device 102 may collect data from other operations, applications, and/or accessory devices. These operations, applications, and/or accessory devices may comprise scheduling application, locating information, time/date information, and/or biometric readings of sensory subsystems and/or devices. In step 464, self-learning may be performed. For example, location information may become available during the generation of new digital pictures. Subsequently, utilizing location information attributes in tagging digital picture may become possible. Analyzing a device user's activities in prior instances where new attributes became available may enable a determination whether the new attribute in this instance need be also added to information utilized in tagging operations. Information derived from performing self-learning or adaptive techniques may determine whether user preference information may be updated and/or modified.

In step 466, it may be determined whether the user preference information needs to be updated. This determination may utilize information derived from performing self-learning techniques in step 464. In instances where the user preference information need not be updated, the exemplary steps may proceed to "DONE," where the exemplary steps may terminate. In instance the user preference information needs to be updated, the exemplary steps may proceed to step 468. In step 436, the user preference information may be updated. For example, self-learning technique may indicate that a device user may desire utilizing location information when generating digital pictures, user preference information may be update to utilize location attributes when generating context data tags for digital pictures generated and/or modified.

Various embodiments of the invention may comprise a method and system for utilizing and modifying user preference information to create context data tags to index data in a wireless system. The WMC device 102 may be utilized to generate and/or maintain multimedia data files. Context data tags may be utilized to tag the generated multimedia data files, enabling identification of multimedia data files and/or content without directly accessing said multimedia data files. The context data tags may comprise such information as time/date stamping, subject attribute, and/or location attribute. The WMC device 102 may maintain user preference information, which is unique to the WMC device 102 capabilities and/or a specific device user, and the user preference information may be utilized to create said context data tags. The user preference information may be modified and/or updated, and said modification and/or updates may be performed dynamically. Biometric data may be utilized in creating said context data tags and/or modifying said user preference information. Post-processing operations may be performed on multimedia data files in the WMC device 102 and/or external to the WMC device 102, in the remote device 104 for example. The user preference information may be modified and/or updated based on the post-processing operations. The post-processing operations may comprise speech recognition and/or image processing. Tagged multimedia data files may be re-tagged, and re-tagging may be due to modification to user preference information and/or post-processing operations. Modification and/or updates of user preference information may be based on self-learning techniques that may comprise information derived from operations performed in the WMC device 102 in general, and/or operations on multimedia data files specifically. The user preference information may be stored external to the WMC device, in the remote device 104 for example.

Another embodiment of the invention may provide a machine-readable storage, having stored thereon, a computer program having at least one code section executable by a machine, thereby causing the machine to perform the steps as described herein for creating context data tags to index data in wireless system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a wireless device, the method comprising:
    tagging first data by a wireless mobile communication device with a context data tag as the first data is being generated, the context data tag being based on user preference information, wherein said user preference information is designated by a particular user and said user preference information specifies attributes to create said context data tag;
    modifying said user preference information by automatically determining new attributes to include in the user preference information based on adaptive learning from user use of the new attributes with respect to second data that is different from the first data; and
    re-tagging said first data with context data tags created from the new attributes according to said modified user preference information,
    wherein said user preference information comprises date, time, and location information.

2. The method according to claim 1, comprising updating said user preference information based on user biometric data.

3. The method according to claim 1, comprising dynamically modifying said user preference information during generation of said first data.

4. The method according to claim 1, comprising modifying said user preference information via a post-processing operation of the second data.

5. The method according to claim 4, wherein said post-processing operation comprises at least one of speech recognition or image processing.

6. The method according to claim 4, comprising generating a new context data tag via said post-processing operation, the new context data tag being generated based on the modified user preference information.

7. The method according to claim 6, wherein re-tagging comprises utilizing said generated new context data tag.

8. The method according to claim 1, comprising automatically determining the new attribute based on self-learned information associated with a user operation performed on said second data.

9. The method according to claim 1, wherein at least a portion of said user preference information is stored within said wireless mobile communication device.

10. A non-transitory computer-readable medium encoded with computer-readable instructions thereon, the computer-readable instructions when executed by a processor cause the processor of a wireless mobile communication device to perform a method comprising:
tagging first data with a context data tag as the first data is being generated, the context data tag being based on user preference information, wherein said user preference information is designated by a particular user and said user preference information specifies attributes to create said context data tag;
automatically determining new attributes by adaptively learning from user use of the new attributes with respect to second data that is different from the first data during a post-processing operation performed on the second data; and
re-tagging said first data with context data tags created from the new attributes according to the new attributes,
wherein said user preference information comprises date, time, and location information.

11. The non-transitory computer-readable medium according to claim 10, further comprising:
updating said user preference information based on user biometric data.

12. The non-transitory computer-readable medium according to claim 10, further comprising dynamically modifying said user preference information during generation of said first data.

13. The non-transitory computer-readable medium according to claim 10, further comprising modifying said user preference information via said post-processing operation of said second data.

14. The non-transitory computer-readable medium according to claim 13, wherein said post-processing operation comprises at least one of speech recognition or image processing.

15. The non-transitory computer-readable medium according to claim 13, further comprising generating a new context data tag via said-post-processing operation, the new context data tag being generated based on the modified user preference information.

16. The non-transitory computer-readable medium according to claim 15, further comprising re-tagging said tagged first data utilizing said generated new context data tag.

17. The non-transitory computer-readable medium according to claim 10, further comprising determining the new attribute based on self-learned information associated with said post-processing operation performed on said second data.

18. The non-transitory computer-readable medium according to claim 10, wherein at least a portion of said user preference information is stored within said wireless mobile communication device.

19. A system for handling data in a wireless device, the system comprising:
one or more processors disposed in a wireless mobile communication device and configured to tag data with a context data tag as the data is being generated, the context data tag being based on user preference information, wherein said user preference information is designated by a particular user and said user preference information specifies attributes to create said context data tag;
said one or more processors being further configured to
automatically determine new attributes by adaptively learning from user use of the new attributes with respect to second data that is different from the first data during a post-processing operation performed on said second data according, and
re-tag said data with context data tags created from the new attributes according to the new attributes,
wherein said user preference information comprises date, time, and location information.

20. The system according to claim 19, wherein said one or more processors updates said user preference information based on user biometric data.

21. The system according to claim 19, wherein said one or more processors dynamically modifies said user preference information during generation of said data.

22. The system according to claim 19, wherein said one or more processors enables modifying said user preference information via said post-processing operation of the tagged data.

23. The system according to claim 22, wherein said post-processing operation comprises at least one of speech recognition or image processing.

24. The system according to claim 22, wherein said one or more processors generates a new context data tag via said post-processing operation, the new context data tag being generated based on the modified user preference information.

25. The system according to claim 24, wherein said one or more processors re-tags said tagged data utilizing said generated new context data tag.

26. The system according to claim 19, wherein said one or more processors determines the new attribute based on self-learned information associated with said post-processing operation performed on said tagged data.

27. The system according to claim 19, wherein at least a portion of said user preference information is stored within said wireless mobile communication device.

* * * * *